W. FOSTER.
PONTOONS FOR RAISING SUNKEN VESSELS, &c.
No. 182,815. Patented Oct. 3, 1876.
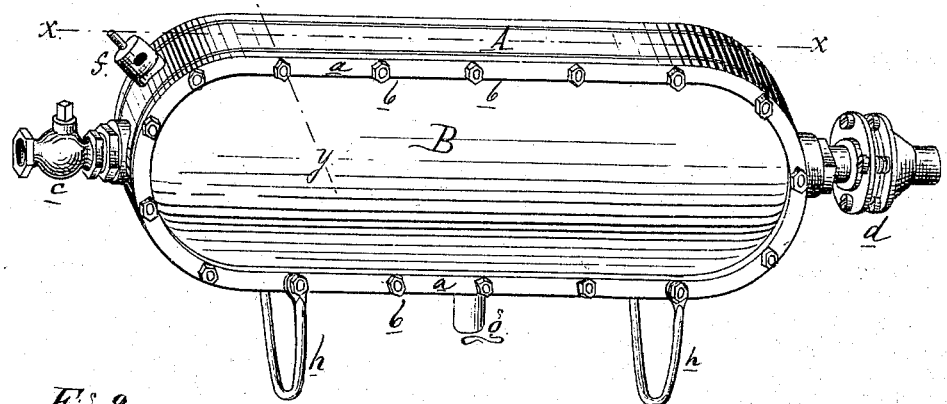
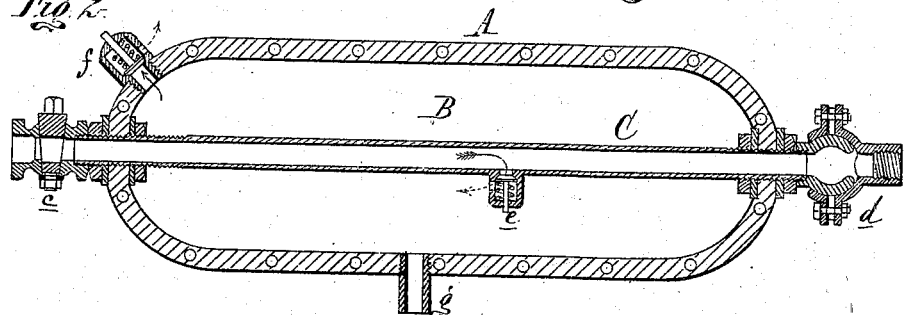
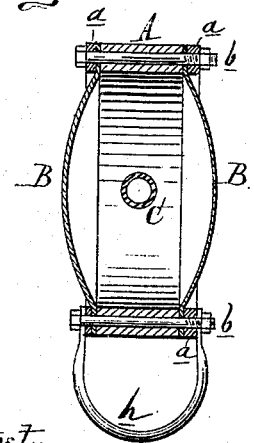
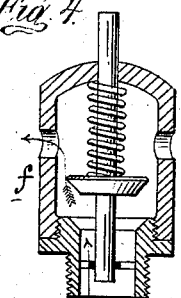
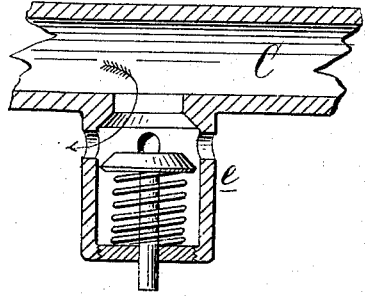
Attest:
Edward Barthel
Charles J. Hunt
Inventor:
Wm Foster
By Atty

UNITED STATES PATENT OFFICE.

WILLIAM FOSTER, OF DETROIT, MICHIGAN, ASSIGNOR TO HIMSELF AND WM. TRAVIS, OF SAME PLACE.

IMPROVEMENT IN PONTONS FOR RAISING SUNKEN VESSELS, &c.

Specification forming part of Letters Patent No. 182,815, dated October 3, 1876; application filed August 25, 1876.

*To all whom it may concern:*

Be it known that I, WILLIAM FOSTER, of Detroit, in the county of Wayne and State of Michigan, have invented an Improvement in Wrecking-Pontons, of which the following is a specification:

My invention relates to an improvement in pontons to be used in raising sunken vessels; and consists, mainly, in the peculiar construction of the ponton with collapsible sides, so that it can be sent down, with others, and made fast to the wreck before inflating it; also, the combination therewith of a check-valve, safety-valve, and a vent, as more fully hereinafter set forth.

Figure 1 is a perspective view. Fig. 2 is a longitudinal vertical section at $x\ x$. Fig. 3 is a transverse section at $y\ y$. Fig. 4 is an enlarged section of the safety-valve. Fig. 5 is a similar section of the check-valve.

In the drawing, A represents the frame of the ponton, preferably made of heavy laminated vulcanized india-rubber, with parallel sides and rounded ends. B B are the sides, made of heavy, but flexible, laminated sheet-rubber, secured to the edges of the frame by a clamp, $a$, of metal, of the same shape, and by bolts $b$, passing through all, as seen in Fig. 3. C a main air-pipe, passing through the longitudinal axis of the frame. One projecting end of this pipe is fitted with a stop-cock, $c$, and at the other is a universal or ball joint coupling, $d$, which, as well as the cock, is adapted to couple with a flexible air-pipe, connecting it with other pontons, which are sent down and arranged by submarine divers in equal numbers on each side of the wreck. The stop-cock of the last one is closed, and to the coupling of the next one (or first in the series) is coupled a hose-pipe, leading from a steam air-pump on the deck of the vessel above, which supplies air under pressure to the line of air-pipes C, in each of which, inside of each ponton, the cage of a check-valve, $e$, is tapped into said air-pipe, opening downwardly, as seen in Figs. 2 and 5, to admit air to inflate the ponton.

In the top of the frame is tapped a spring-closed safety-valve, $f$, and in the center of the bottom is an open vent, $g$, as shown. To the lower side of the frame two bales, $h\ h$, are secured, from each of which a chain is passed under the bottom of the wreck, and made fast to a similar bale under a submerged ponton at the opposite side.

The pontons, being in position at the sides of the wreck, and collapsed, they are simultaneously inflated with air, by the means described, to any desired pressure less than that of the column of water, the air being retained by the check-valves, and by the buoyancy thus obtained the pontons rise and lift the wreck with them to the surface of the water, where suitable arrangements for salvage can can be made. As the external pressure decreases as the pontons rise to the surface, a portion of the contained air escapes through the bottom vent $g$.

The safety-valve $f$ is added to prevent rupture from undue pressure accidentally put on. In case of rupture of any one of a set of submerged pontons, the ruptured one may be taken out of the line by the divers after closing the cocks at each side, sending it up, and replaced by another, without filling the rest of the series with water.

These pontons can be made of any convenient size, and strong enough to resist the pressure of any column of water at a depth in which it is practicable for divers to work.

What I claim as my invention is—

1. A wrecking-ponton, consisting of the rigid frame A, and collapsible sides B B, constructed substantially as described and shown.

2. In a collapsible wrecking-ponton, the combination, with the frame A B B, of the central pipe C, running the entire length of the ponton, and the check-valve $e$ in the said pipe, substantially as described and shown.

3. The combination, with the wrecking-ponton A B B, of the central pipe C, running the entire length of the said ponton, check-valve $e$, stop-cock $c$, and universal ball-joint coupling $d$, substantially as described and shown.

4. In a wrecking-ponton, the combination, with the frame A B B, of the pipe C, having stop-cock $c$, ball-joint $d$, and check-valve $e$, the safety-valve $f$, and open vent $g$, all constructed and arranged substantially as described and shown.

WILLIAM FOSTER.

Witnesses:
CHARLES J. HUNT,
THEO. S. DAY.